A. QUINONES.
EDUCATIONAL BOARD.
APPLICATION FILED NOV. 2, 1916.

1,213,690.   Patented Jan. 23, 1917.

Alfredo Quinones,
Inventor

By Geo. S. Kimmel
Attorney

UNITED STATES PATENT OFFICE.

ALFREDO QUINONES, OF NEW ORLEANS, LOUISIANA.

EDUCATIONAL BOARD.

1,213,690.   Specification of Letters Patent.   Patented Jan. 23, 1917.

Application filed November 2, 1916. Serial No. 129,168.

*To all whom it may concern:*

Be it known that I, ALFREDO QUINONES, a citizen of the Republic of Salvador, residing at New Orleans, in the parish of Orleans and State of Louisiana, have invented certain new and useful Improvements in Educational Boards, of which the following is a specification.

The present invention relates to educational toys and has particular reference to new and useful improvements in puzzle boards or the like.

An object of my invention is to provide a toy which presents to a child a problem, thereby being both instructive and amusing, it being possible to use the device in lieu of a slate for producing various representations of various figures.

My invention contemplates the provision of an article which will tend to develop the constructive faculties of children, making more apparent to them the necessity of attention to details.

My invention also contemplates the provision of a device which may be cheaply manufactured, will withstand considerable abuse and may be cheaply constructed and sold.

Figure 1:
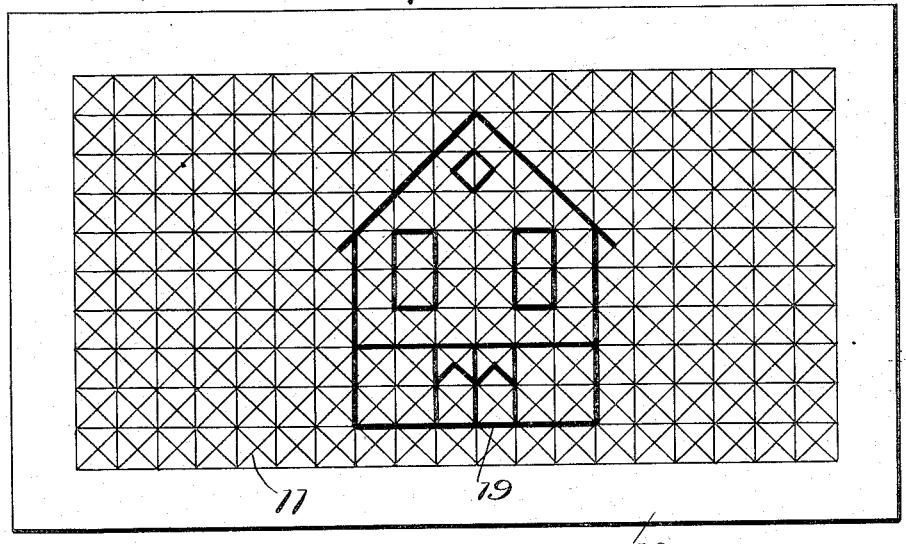
Figure 2:
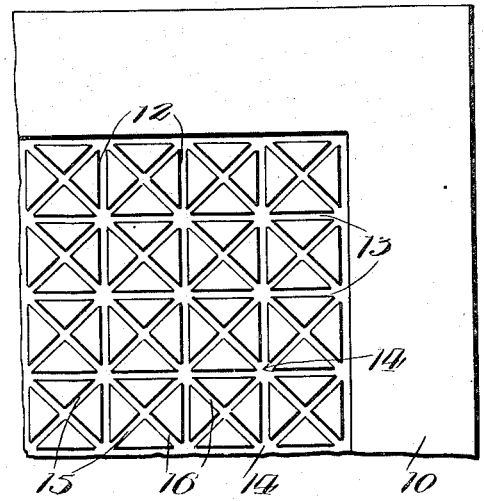
Figure 3:
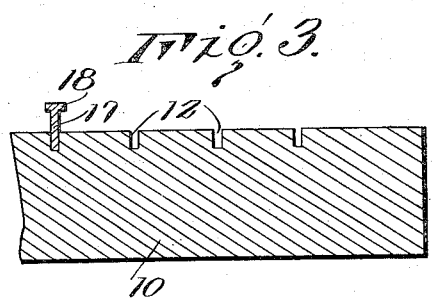

Other objects and advantages to be derived from the use of my improved educational device will appear from the following detailed description and the claims, taken with an inspection of the accompanying drawing, in which:

Figure 1 is a top plan view of a board embodying the improvements of my invention; Fig. 2 is an enlarged fragmental view of a portion of the same; Fig. 3 is an enlarged fragmental section; and Fig. 4 is a detail perspective of one of the elements for use in connection with the board.

Referring more particularly to the drawing, wherein similar characters of reference designate like and corresponding parts throughout the various views, 10 designates the body of my improved educational board, the upper surface of said body being provided with a regularly grooved portion 11, the grooves of which are arranged as best shown in Figs. 2 and 3.

Referring to Fig. 2 a plurality of parallel transversely arranged grooves 12 are provided, said grooves intersecting parallel longitudinally extending grooves 13 at the point 14. The provision of the grooves 12 and 13 form a plurality of squares, said squares being in turn divided by right-angularly related sets of diagonal grooves 15 and 16, said diagonal grooves intersecting the grooves 12 and 13 at the point 14 hereinbefore referred to.

Figure 4:
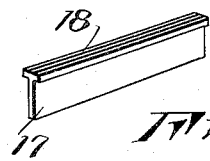

The pattern or representation is afforded by means of a plurality of the articles shown in Fig. 4, the same consisting of a strip 17 formed with a head 18 which may be of a color other than that of the board 10.

In Fig. 1 a house is represented by the diagram 19, said diagram being built up of a plurality of the strips 17 inserted in the grooves. Thus it will be seen that a child may be instructed in the construction of buildings in so far as the general contour of the same is concerned, the device not only serving as an educational appliance but also amusing a child. Of course, I do not limit myself to the exact arrangement of the grooves but it will be found that in this arrangement a relatively wide scope of use is afforded. Any objects not having round corners may be represented on the board 10. The strips 17 are retained in the grooves merely by means of friction and are readily removable therefrom. The heads 18 of the strips 17 are of colors different from that of the board so that the representation of an object will be readily discernible.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a toy of the class described, the combination of a board having a plurality of intersecting angularly related grooves, a plurality of strips for insertion in certain of said grooves to produce various representations of objects, said strips having heads, the heads being of a color other than that of the face so as to render the design discernible.

2. In a device as specified, the combination of a board having a plurality of transverse and longitudinal relatively spaced grooves, said board also having a plurality of angularly related diagonally extending grooves, all of said grooves intersecting each other at common points, and a plurality of strips, said strips having colored head portions to exhibit a design when combined as placed in various of the grooves.

In testimony whereof, I affix my signature hereto.

ALFREDO QUINONES.